(12) United States Patent
Hoffman et al.

(10) Patent No.: US 8,056,929 B2
(45) Date of Patent: Nov. 15, 2011

(54) LAYERED IMAGE DISPLAY APPLICATIONS AND METHODS

(75) Inventors: Anthony Lynn Hoffman, Eagan, MN (US); Michael Alan Challeen, Inver Grove Heights, MN (US); John Tomczyk, Shoreview, MN (US); Alain Yves Abdelkader, Flagstaff, AZ (US)

(73) Assignee: Travel Tags, Inc., North Mankato, MN (US)

( * ) Notice: Subject to any disclaimer, the term of this patent is extended or adjusted under 35 U.S.C. 154(b) by 822 days.

(21) Appl. No.: 11/906,398

(22) Filed: Oct. 2, 2007

(65) Prior Publication Data

US 2008/0088126 A1    Apr. 17, 2008

Related U.S. Application Data

(60) Provisional application No. 60/848,728, filed on Oct. 2, 2006.

(51) Int. Cl.
*B42D 15/00* (2006.01)
*B42D 15/10* (2006.01)
*G09F 3/00* (2006.01)

(52) U.S. Cl. .......... 283/98; 283/67; 283/71; 283/72; 283/94; 283/114; 283/901

(58) Field of Classification Search .......... 281/51; 283/57, 67, 71, 72, 74, 81, 82, 85, 86, 87, 283/88, 89, 91, 92, 93, 94, 98, 100, 107, 283/108, 109, 110, 111, 113, 114, 117, 901
See application file for complete search history.

(56) References Cited

U.S. PATENT DOCUMENTS

| | | | |
|---|---|---|---|
| 3,503,315 A | | 3/1970 | de Montebello |
| 3,725,184 A | * | 4/1973 | Scopp .......... 283/107 |
| 4,414,316 A | | 11/1983 | Conley |
| 4,920,039 A | | 4/1990 | Fotland et al. |
| 4,935,335 A | | 6/1990 | Fotland |
| 5,034,982 A | | 7/1991 | Heninger et al. |
| 5,266,995 A | | 11/1993 | Quadracci et al. |

(Continued)

FOREIGN PATENT DOCUMENTS

CN    2719578 Y    8/2005

(Continued)

OTHER PUBLICATIONS

International Search Report of PCT/US07/21115, mailed Mar. 13, 2008 (3 pgs).

(Continued)

*Primary Examiner* — Dana Ross
*Assistant Examiner* — Justin Lewis
(74) *Attorney, Agent, or Firm* — Patterson Thuente Christensen Pedersen, P.A.

(57) ABSTRACT

A moiré pattern display sheet defined by a surface is described. A first layer has a pattern printed thereon. The pattern includes a series of visual elements in a first row that have been distorted at least in a first direction. The series of visual elements is generated from an electronically saved file of vector based graphics. A light steering optical layer overlaying the first layer. The light steering optical layer comprising a plurality of optical features which change the direction of the light and thereby provide a depth effect of the series of visual elements to a viewer looking through the light steering optical layer.

45 Claims, 12 Drawing Sheets

U.S. PATENT DOCUMENTS

| | | | |
|---|---|---|---|
| 5,285,238 A | 2/1994 | Quadracci et al. | |
| 5,318,807 A | 6/1994 | Gili Picoy | |
| 5,321,749 A | 6/1994 | Virga | |
| 5,330,799 A | 7/1994 | Sandor et al. | |
| 5,362,351 A | 11/1994 | Karszes | |
| 5,457,515 A | 10/1995 | Quadracci et al. | |
| 5,460,679 A | 10/1995 | Abdel-Kader | |
| 5,492,578 A | 2/1996 | Morton | |
| 5,554,432 A | 9/1996 | Sandor et al. | |
| 5,642,226 A | 6/1997 | Rosenthal | |
| 5,685,570 A * | 11/1997 | Gray et al. | 283/71 |
| 5,753,344 A | 5/1998 | Jacobsen | |
| 5,762,379 A | 6/1998 | Salmon et al. | |
| 5,772,249 A * | 6/1998 | Guex et al. | 283/93 |
| 5,949,420 A | 9/1999 | Terlutter | |
| 6,113,149 A | 9/2000 | Dukatz | |
| 6,170,881 B1 | 1/2001 | Salmon et al. | |
| 6,251,566 B1 | 6/2001 | Brosh et al. | |
| 6,252,621 B1 | 6/2001 | Kessler et al. | |
| 6,256,150 B1 | 7/2001 | Rosenthal | |
| 6,373,636 B1 | 4/2002 | Conley | |
| 6,424,323 B2 * | 7/2002 | Bell et al. | 345/9 |
| 6,424,467 B1 | 7/2002 | Goggins | |
| 6,490,092 B1 | 12/2002 | Goggins | |
| 6,494,491 B1 * | 12/2002 | Zeiter et al. | 283/91 |
| 6,596,361 B2 | 7/2003 | Klein et al. | |
| 6,624,946 B2 | 9/2003 | Franko, Sr. | |
| 6,751,024 B1 | 6/2004 | Rosenthal | |
| 6,781,761 B2 | 8/2004 | Raymond | |
| 6,784,962 B2 | 8/2004 | Sumida et al. | |
| 6,795,250 B2 | 9/2004 | Johnson et al. | |
| 6,833,960 B1 | 12/2004 | Scarbrough et al. | |
| 6,843,009 B2 | 1/2005 | Kainen | |
| 6,856,462 B1 | 2/2005 | Scarbrough et al. | |
| 6,872,277 B2 | 3/2005 | Klein et al. | |
| 6,900,944 B2 | 5/2005 | Tomczyk | |
| 6,974,080 B1 | 12/2005 | Goggins | |
| 6,989,931 B2 | 1/2006 | Rosenthal | |
| 6,995,913 B2 | 2/2006 | Goggins | |
| 7,001,654 B2 | 2/2006 | Kiraly et al. | |
| 7,002,748 B1 | 2/2006 | Conley et al. | |
| 7,048,307 B1 | 5/2006 | Scarbrough et al. | |
| 7,075,725 B2 | 7/2006 | Tomczyk | |
| 7,083,340 B2 | 8/2006 | Goggins | |
| 7,101,437 B2 | 9/2006 | Boutilier et al. | |
| 7,114,750 B1 * | 10/2006 | Alasia et al. | 283/72 |
| 7,130,126 B1 | 10/2006 | Chung | |
| 7,136,185 B2 | 11/2006 | Goggins | |
| 7,149,035 B2 | 12/2006 | Goggins | |
| 7,164,537 B2 | 1/2007 | Raymond | |
| 7,165,959 B2 | 1/2007 | Humlicek et al. | |
| 7,190,518 B1 | 3/2007 | Kleinberger et al. | |
| 7,212,346 B2 | 5/2007 | Krause | |
| 7,239,420 B2 | 7/2007 | Goggins | |
| 7,242,525 B2 | 7/2007 | Raymond | |
| 7,259,916 B2 | 8/2007 | Raymond | |
| 7,290,802 B1 | 11/2007 | Scarbrough et al. | |
| 7,290,803 B2 | 11/2007 | Scarbrough et al. | |
| 7,304,802 B2 | 12/2007 | Raymond | |
| 7,307,790 B1 | 12/2007 | Raymond et al. | |
| 7,359,120 B1 | 4/2008 | Raymond et al. | |
| 7,414,790 B2 | 8/2008 | Raymond et al. | |
| 7,465,369 B2 | 12/2008 | Raymond | |
| 7,468,842 B2 | 12/2008 | Steenblik et al. | |
| 7,545,565 B2 | 6/2009 | Tomczyk | |
| 7,545,566 B2 | 6/2009 | Tomczyk | |
| 7,545,567 B2 | 6/2009 | Tomczyk | |
| 7,654,579 B2 * | 2/2010 | Hansen | 283/72 |
| 2003/0108198 A1 | 6/2003 | Lahiri | |
| 2004/0095648 A1 | 5/2004 | McCannel et al. | |
| 2004/0115376 A1 | 6/2004 | Tomczyk | |
| 2004/0136079 A1 | 7/2004 | Goggins | |
| 2004/0263885 A1 | 12/2004 | Tomczyk | |
| 2005/0156813 A1 | 7/2005 | Adachi et al. | |
| 2005/0184504 A1 * | 8/2005 | Alasia et al. | 283/72 |
| 2006/0151993 A1 * | 7/2006 | Nemeth | 283/107 |
| 2006/0285215 A1 | 12/2006 | Wu | |
| 2007/0058258 A1 | 3/2007 | Mather et al. | |
| 2007/0132122 A1 | 6/2007 | Raymond et al. | |
| 2007/0188874 A1 | 8/2007 | Robb et al. | |
| 2008/0088126 A1 | 4/2008 | Hoffman et al. | |
| 2008/0088931 A1 | 4/2008 | Hoffman et al. | |
| 2008/0106091 A1 | 5/2008 | Tompkin et al. | |
| 2008/0129038 A1 | 6/2008 | Scarbrough | |
| 2008/0213528 A1 | 9/2008 | Hoffman et al. | |
| 2008/0284157 A1 * | 11/2008 | Muke et al. | 283/86 |
| 2009/0097114 A1 | 4/2009 | Mimura et al. | |
| 2009/0168165 A1 | 7/2009 | Hoffman | |
| 2009/0251787 A1 | 10/2009 | Tomczyk | |
| 2009/0315321 A1 | 12/2009 | Michieli et al. | |
| 2010/0015403 A1 | 1/2010 | Sacks et al. | |
| 2010/0018644 A1 | 1/2010 | Sacks et al. | |
| 2010/0134895 A1 | 6/2010 | Hoffman et al. | |
| 2010/0182666 A1 | 7/2010 | Herbert et al. | |

FOREIGN PATENT DOCUMENTS

| | | |
|---|---|---|
| FR | 2551559 | 3/1985 |
| FR | 2551560 | 3/1985 |
| WO | WO 97/03826 | 2/1997 |
| WO | WO 2004/021069 | 3/2004 |
| WO | WO 2006/029745 | 3/2006 |
| WO | WO 2008/042348 A1 | 4/2008 |
| WO | WO 2008/042349 A2 | 4/2008 |
| WO | WO 2008/079268 A2 | 7/2008 |

OTHER PUBLICATIONS

International Search Report of PCT/US07/21114, mailed Mar. 12, 2008 (3 pgs).

Search Report dated Jun. 5, 2008 for PCT Application No. PCT/US2007/026012 filed Dec. 19, 2007, 3 pages.

Application and File history for U.S. Appl. No. 11/906,397, filed Oct. 2, 2007. Inventors: Anthony L. Hoffman et al. at www.uspto.gov.

Application and File history for U.S. Appl. No. 12/004,097, filed Dec. 19, 2009. Inventors: Anthony L. Hoffman et al. at www.uspto.gov.

Search Report dated Apr. 30, 2010 for PCT Application No. PCT/US2009/057529 filed Sep. 18, 2009, 11 pages.

Application and File history for U.S. Appl. No. 12/562,795, filed Sep. 18, 2009. Inventors: Hoffman et al. at www.uspto.gov.

Web page entitled "3D Lenticular and Hologravure Packaging " by 3DZ. Web archive Jun. 21, 2006 http://web.archive.org/web/20060621035150/http://www.3dz.co.uk/packaging.html.

Amendment filed Nov. 30, 2010 in response to Office Action dated Jun. 30, 2010 for U.S. Appl. No. 11/906,397, filed Oct. 2, 2007, 23 pages.

Amendment filed Dec. 2, 2010 in response to Office Action dated Aug. 2, 2010 for U.S. Appl. No. 12/004,097, filed Dec. 19, 2007, 20 pages.

Final Office Action dated Feb. 14, 2011 for U.S. Appl. No. 12/004,097 filed Dec. 19, 2007, 25 pages.

Final Office Action dated Mar. 2, 2011 for U.S. Appl. No. 11/906,397 filed Oct. 2, 2007, 25 pages.

Amendment filed Jun. 2, 2011 for U.S. Appl. No. 11/906,397 filed Oct. 2, 2007, 18 pages.

Brochure, "3-D Images", known to applicant at least as of May 11, 2011, 8 pages.

Advisory Action dated Jun. 27, 2011 for U.S. Appl. No. 11/906,397 filed Oct. 2, 2007, 3 pages.

* cited by examiner

LAYERED IMAGE DISPLAY APPLICATIONS AND METHODS

This application claims the benefit of U.S. Provisional Application Ser. No. 60/848,728 filed on Oct. 2, 2006, entitled "LAYERED IMAGE DISPLAY APPLICATIONS AND METHODS," which application is incorporated herein by reference in its entirety.

BACKGROUND

The invention generally relates to applications and techniques of moiré pattern display sheets which create a visual layered image effect and which may be used as gift cards, stamps, hidden images, among other uses.

It is conventionally known to create display sheets which may be used for labeling, decoration, advertising, etc. that provide a visual effect of depth. The visual effect provides a pattern which appears to be in back of or in front of another image. This depth effect may also be referred to as a layered image effect. Such a layered image effect may be produced by using a series of images that are distorted in one direction (e.g. distorted in the width). The effect is created by overlaying a lenticular display screen which steers light thereby producing the depth effect of the series images. A static or a focal image may interrupt and overlay the series of images. The static or the focal image may be a plain image, an interlaced image, or other types of images.

This technique may be referred to as the creation of moiré patterns which is an interferometric effect.

Conventional applications and techniques of moiré pattern layered image creation have been very limited. Accordingly, there is a need for new or improved techniques of applying moiré pattern layered image creation. There is also a need for new or improved applications of moiré pattern technology.

The techniques herein below extend to those embodiments which fall within the scope of the appended claims, regardless of whether they accomplish one or more of the above-mentioned needs.

SUMMARY

What is provided is a moiré pattern display sheet defined by a surface. The display sheet includes a first layer having a pattern printed thereon. The pattern comprises a series of visual elements in a first row that have been distorted at least in a first direction. The series of visual elements is generated from an electronically saved file of vector based graphics. A light steering optical layer overlays the first layer. The light steering optical layer comprises a plurality of optical features which change the direction of the light and thereby provide a depth effect of the series of visual elements to a viewer looking through the light steering optical layer.

What is provided is a method of forming a moiré pattern display sheet defined by a surface. The method includes generating an image file having a series of visual elements defined by vector based graphics. The method also includes modifying the image of the image file based on the output printing device. Further, the method includes printing a first layer with the modified image, the modified image comprising the series of visual elements. Further still, the method includes providing a light steering optical layer that overlays the first layer, the light steering optical layer comprising a plurality of optical features which change the direction of the light and thereby provide a depth effect of the visual elements to a viewer looking through the light steering optical layer.

Further, what is provided is a hidden message system. The system includes a message surface having a first moiré pattern printed thereon. The moiré pattern comprises a series of visual elements that have been distorted in at least a first direction. A first message decoder has a light steering optical element that is distinct from the message surface but when maneuvered adjacent the message surface, a visual image which comprises substantially undistorted visual elements, is revealed.

Further still, what is provided is a method of producing a hidden message. The method includes displaying a message surface having a first moiré pattern printed thereon. The first moiré pattern comprises a series of visual elements that have been distorted in at least a first direction. The method also includes positioning a first message decoder having a light steering optical element that is distinct from the message surface, adjacent the message surface, to reveal a visual image comprising substantially undistorted visual elements.

Yet further still, what is provided is a stamp having a moiré pattern display. The stamp includes a first layer having a pattern printed thereon. The pattern comprises a series of visual elements in a first row that have been distorted at least in a first direction. The stamp also includes a light steering optical layer overlaying the first layer. The light steering optical layer comprises a plurality of optical features which change the direction of the light and thereby provide a depth effect of the series of visual elements to a viewer looking through the light steering optical layer. The light steering optical layer is configured to allow adherence of cancellation ink to at least one of the first layer and the optical layer.

Still further, provided is a method of providing a stamp having a moiré pattern display. The method comprises printing a first layer with a pattern. The pattern comprises a series of visual elements in a first row that have been distorted at least in a first direction. The method also includes coupling a light steering optical layer overlaying the first layer. The light steering optical layer comprises a plurality of optical features which change the direction of the light and thereby provide a depth effect of the series of visual elements to a viewer looking through the light steering optical layer. The light steering optical layer is configured to allow adherence of cancellation ink to at least one of the first layer and the optical layer. Further, the method includes coupling an adhesive layer to the first layer.

Yet still further provided is a method of producing a plurality of cards having a moiré pattern display. The method includes printing a first layer with a pattern. The pattern comprises a series of visual elements in a first row that have been distorted at least in a first direction. The pattern or other patterns are printed a plurality of times on a sheet. The method also includes coupling a light steering optical layer overlaying the first layer of at least a portion of the sheet after the printing. The light steering optical layer comprises a plurality of optical features which change the direction of the light and thereby provide a depth effect of the series of visual elements to a viewer looking through the light steering optical layer.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
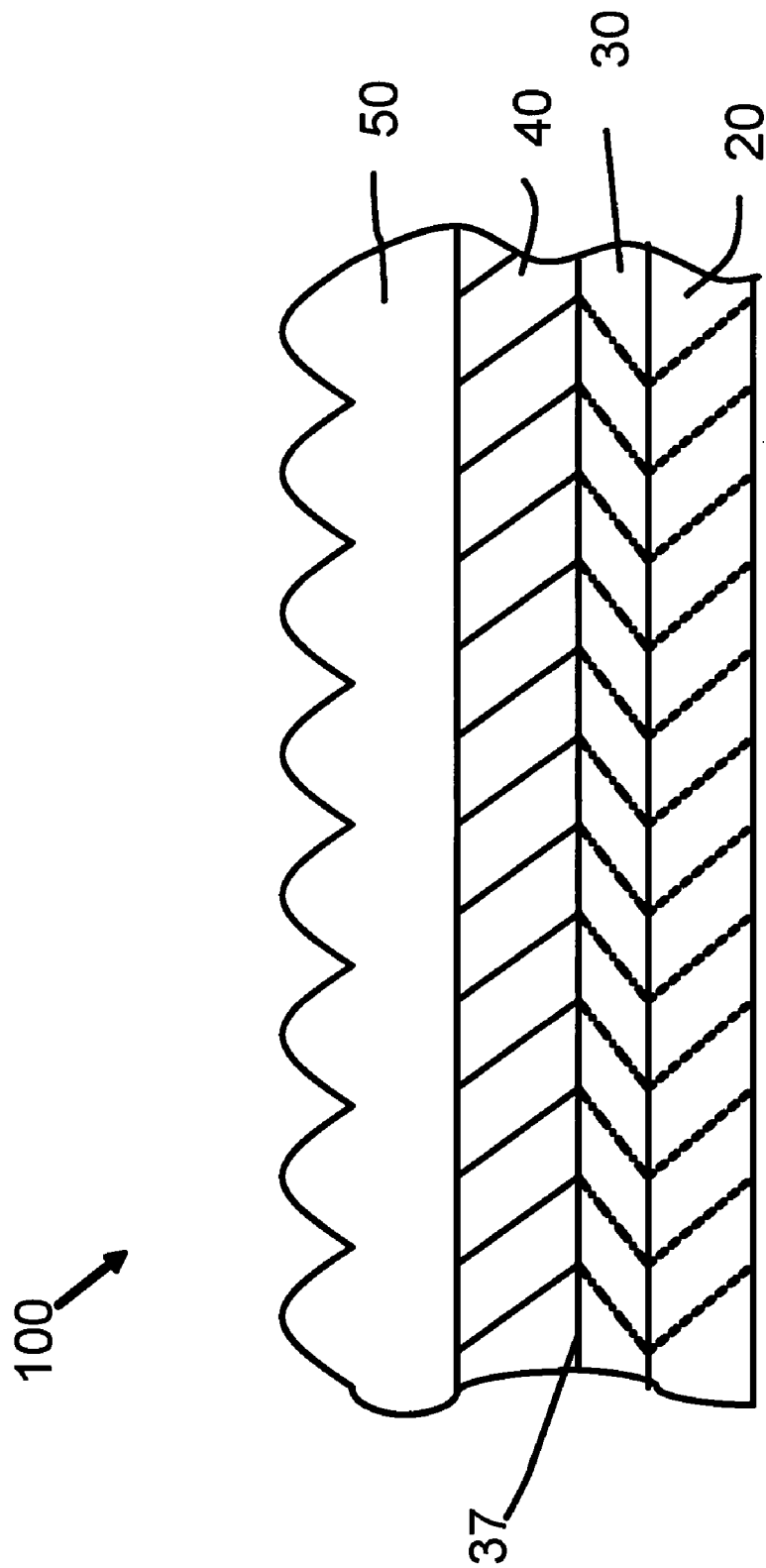
FIG. 1 is an exemplary cross sectional diagram of a lenticular lens sheet overlaying a printed layer, the structure configured to produce a layered image effect.

Before describing in detail the particular improved display sheet and method, it should be observed that the invention includes, but is not limited to a novel structural combination of conventional components and optical sheets, and not in the particular detailed configurations thereof. Accordingly, the structure and methods for the most part, have been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring now to FIG. 1, an exemplary embodiment of a cross section of a lenticular label in accordance with the invention, is depicted. A backing sheet 20, for example, an opaque or clear plastic such as a vinyl laminate layer (alternatively, paper or other materials may be applied), is coated with an adhesive layer 30, such as but not limited to, a glue or resin formulation (alternatively, layer 30 may be a bonding layer created to couple layers 20 and 40 during manufacture through heating or the like). An optional core sheet, for example, an opaque or clear plastic sheet, can be situated between adhesive layer 30 and image layer 40. It is understood that when an optional core sheet is used, a second adhesive layer 37 may be used between the optional core sheet and image layer 40. Image layer 40 can be formed using a variety of materials and methods, such as but not limited to, a curable ink or alternatively a separate image sheet. The lenticular lens top sheet 50 can be formed from a variety of materials, including but not limited to, a clear plastic sheet, a polyvinyl chloride (PVC) sheet, an amorphous polyethylene terephthalate (APET). An optional primer layer (not shown) can be interposed between layers 20-30, 30-40, or 40-50 for better bonding between the layers.

Figure 2:
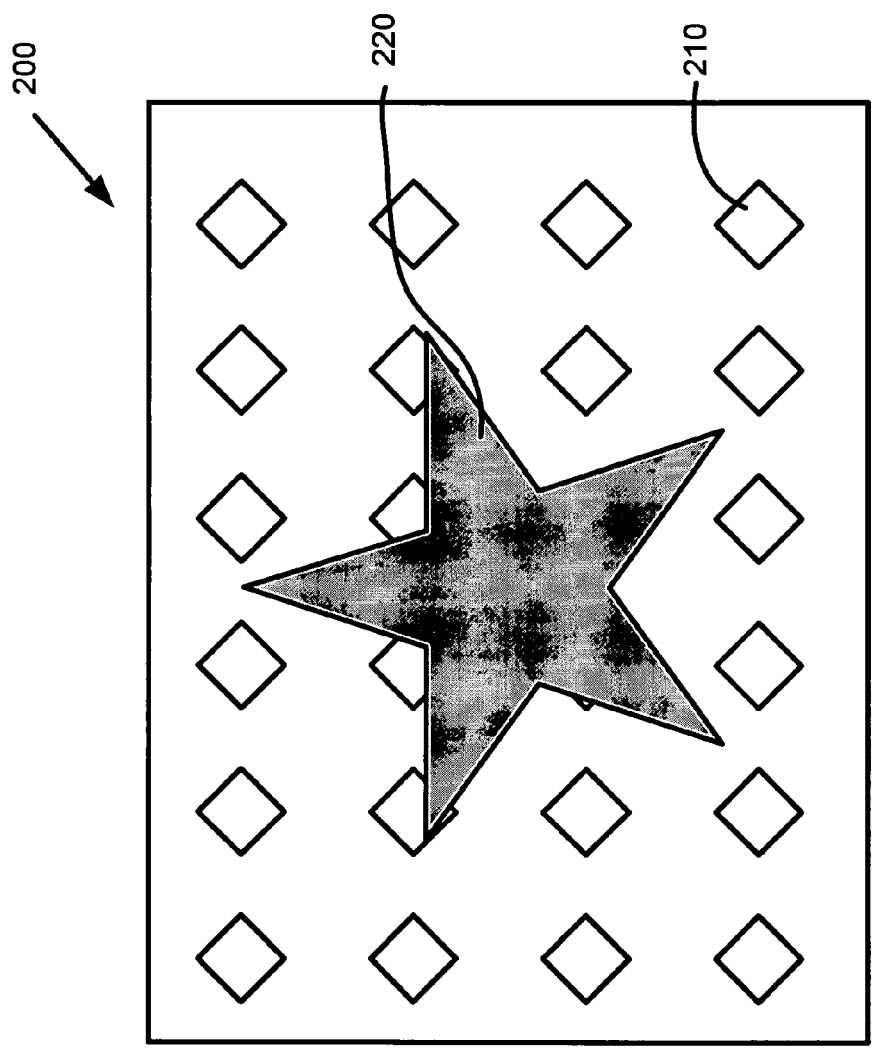
FIG. 2 is an exemplary depiction of a resultant display sheet having a layered image effect.

Referring now to FIG. 2, a display sheet 200 having a background pattern image 210 with a focal image 220 is depicted. Background pattern image 210 is a moiré pattern having a depth effect when coupled with a light steering optical element such as but not limited to a lenticular lens sheet. Focal image 220 may be a conventional flat image or may be an interlaced image providing motion, flips, three-dimensional effects, or other effects as may be conventionally created with a lenticular lens screen. Background pattern image 210 may also be configured as a foreground image without departing from the scope of the invention.

Figure 3:
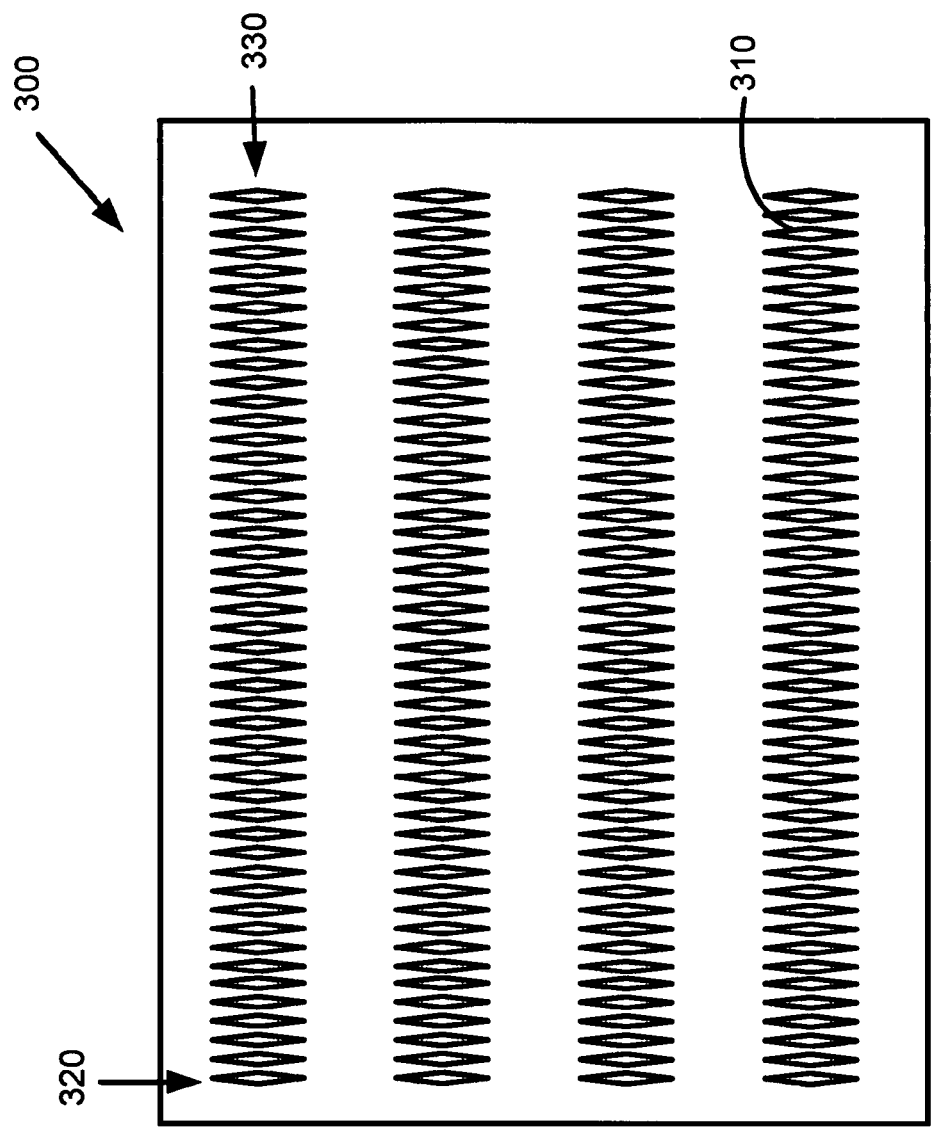
FIG. 3 is an exemplary diagram of a distorted pattern used to produce the layered image effect.

The layered image effect or moiré pattern is created by the combination of a lenticular lens or other light steering device having elongated parallel light steering optical elements or other arrangement of optical elements coupled with distorted pattern elements. For example, an exemplary raw image sheet 300 is depicted in FIG. 3. Raw image sheet 300 has a plurality of distorted pattern elements 310 arranged in a plurality of columns 320 and rows 330. The moiré pattern generation is one application of the science of interferometry (as utilized in the graphic arts' industry), giving optic images the effect of relief, viewed either through transparency or by reflection.

Figure 4:
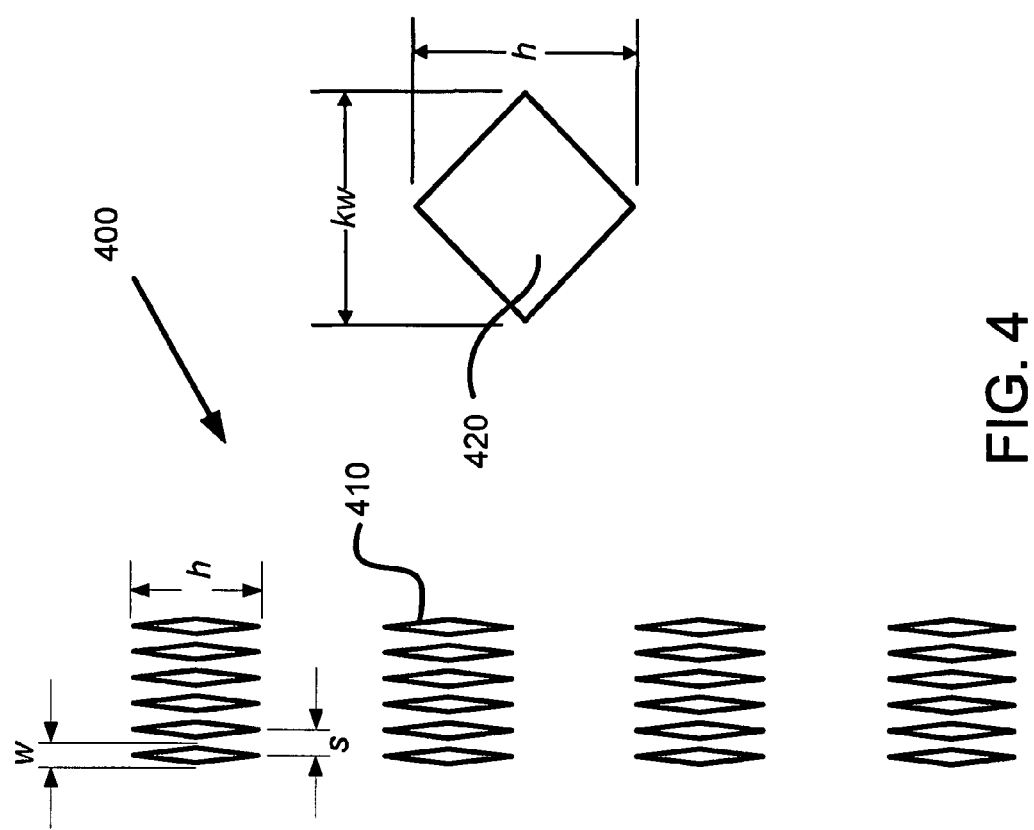
FIG. 4 is an exemplary diagram of a background pattern in accordance with an exemplary embodiment.

Referring now to FIG. 4, an exemplary raw image pattern 400 is depicted. Raw image pattern 400 includes a plurality of distorted pattern elements 410. Each of the distorted pattern elements has a height h which is the height of the resultant pattern element 420 when viewed under a lenticular lens. The width w is distorted from the resultant pattern element 420 width kw, where k is a constant factor typically, but not limited to, on the order of tens or hundreds. Thus, the width of resultant pattern element 420 may be said to be distorted or squeezed in the width direction to have a distorted pattern element 410 width w. In an exemplary embodiment, the width w may be approximately the same width as a single lenticule. The resultant moiré pattern may then be a plurality of pattern elements 420 distributed over a surface but appearing in the background. Referring again to FIG. 2 it may often be desirable to have a focal image such as image 220 which interrupts the pattern. In accordance with an exemplary embodiment the pattern is not necessarily a repeating pattern but may be a pattern which changes or morphs through the display sheet.

Figure 5:
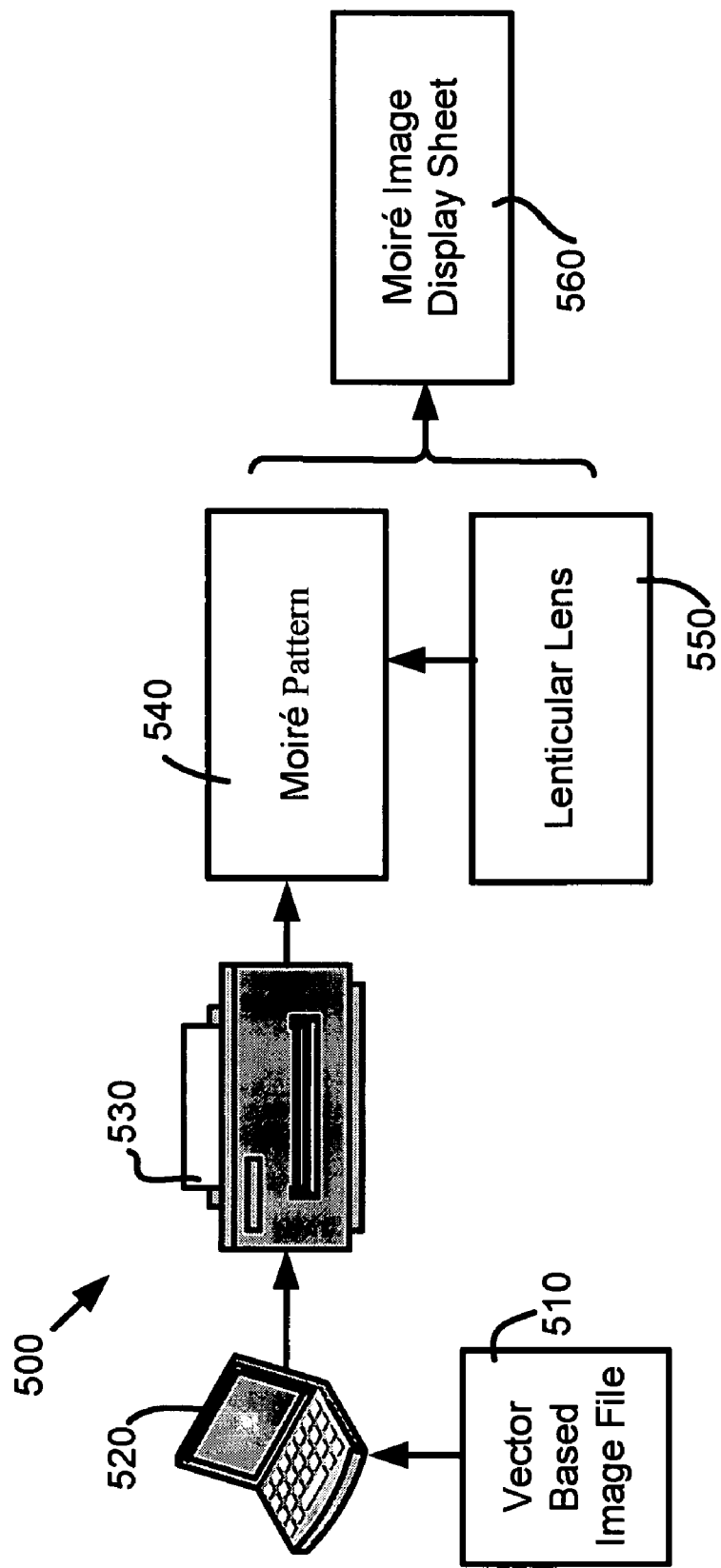
FIG. 5 is an exemplary diagram of a vector graphics based image production system.

Referring now to FIG. 5, a system 500 is depicted for producing a moiré pattern display sheet. The moiré pattern display sheet includes a first layer having a printed pattern. The pattern includes a series of visual elements that are aligned and have been distorted at least in a first direction as depicted in FIGS. 3 and 4. The series of visual elements is generated from an electronically saved file 510 of vector based graphics. File 510 is preferably utilized and/or generated by a computer 520 or other processing device. File 510 is then used to generate printing commands sent to a printer 530 which prints the moiré pattern 540 on a substrate. A light steering optical layer such as but not limited to a lenticular lens 550 overlays the printed layer. The light steering optical layer comprises a plurality of optical features which change the direction of the light and thereby provides a depth effect of the series of visual elements to a viewer looking through the light steering optical layer. Thus, a moiré image display sheet 560 is produced.

In accordance with one exemplary embodiment, the vector based graphics file allows scaling of the series of visual elements in a simplified manner when carried out by computer 520. Further, the vector based graphics file enables scaling of the series of visual elements for a desired output device. That is, for example, any of a number of various printers having different output characteristics (e.g., 1200 dpi, 2400 dpi, 3600 dpi, 4800 dpi, etc.) are easily used and the scaling easily adapted to the given printing device. The vector based graphics file also enables simplified changing of line widths and weights as well as simplifies the procedures for creating series of visual elements which follow defined curves or paths. Also in accordance with an exemplary embodiment, the vector based graphics file may include vector based fonts. Further, in accordance with an exemplary embodiment, the light steering optical layer 550 comprises a lenticular lens sheet that has been printed onto the first layer. The printing may be accomplished by a variety of methods including but not limited to, silk screening, inkjet printing, digital printing, offset printing, flexo printing, sheet fed press, web press, and the like.

Figure 6:
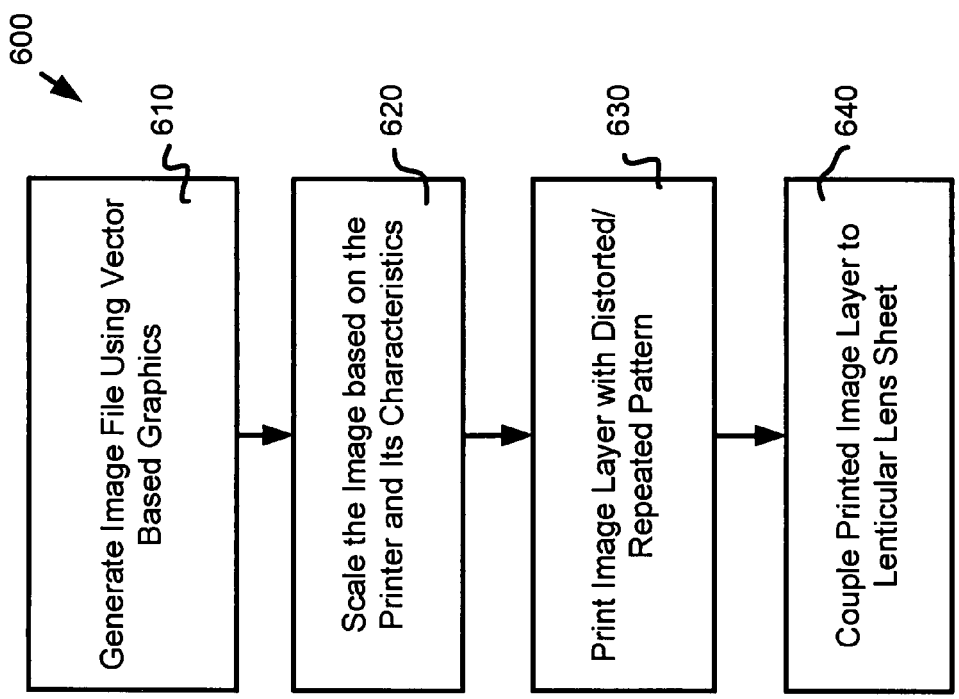
FIG. 6 is an exemplary process diagram of a vector graphics based method of producing a graphic image.

Referring now to FIG. 6, a process 600 of forming a moiré pattern display sheet is depicted. The process starts by generating an image file having a series of visual elements defined by vector based graphics (process 610). The image of the image file is then scaled based on the output printing device and the characteristics of the device being used (process 620). A printed image layer with the scaled image is then printed (process 630). The scaled image printed has a series of visual elements. A light steering optical layer such as but not limited to a lenticular lens is provided to overlay the first layer (process 640). The light steering optical layer includes a plurality of optical features which change the direction of the light and thereby provide a depth effect of the visual elements to a viewer looking through the light steering optical layer. Any of a variety of optical elements may be used including but not limited to barrier screen, and fisheye lenses, among others.

In accordance with an exemplary process, once the scaled image has been printed a light steering optical layer such as a lenticular lens sheet may be applied to the printed image layer by a printing process or other like deposition process.

Figure 7:
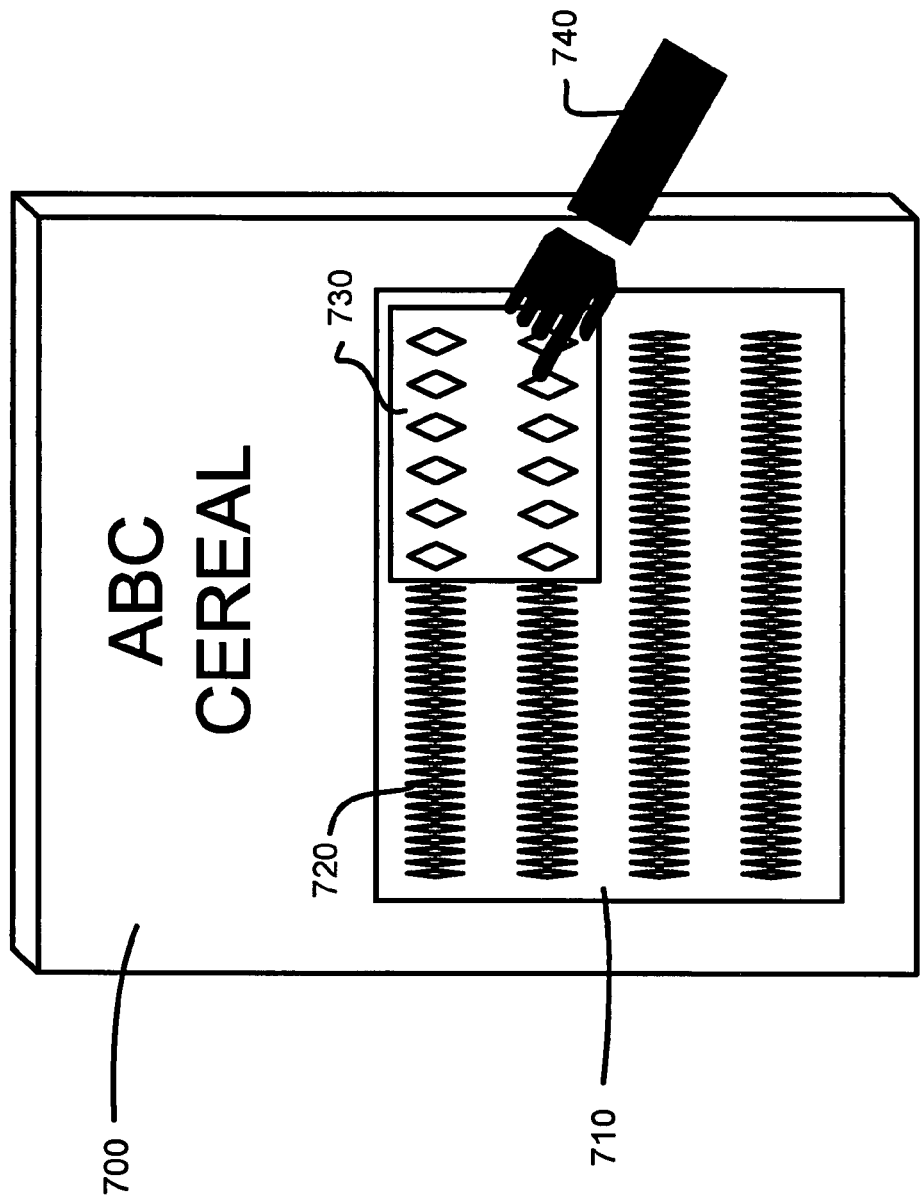
FIG. 7 is an exemplary diagram of an embodiment of a hidden image application.

Referring now to FIG. 7, a display medium such as cereal box 700 is depicted having a moiré pattern hidden image system provided thereon. A hidden message system comprises a display medium 700 with a message surface having a first moiré pattern printed thereon. The moiré pattern includes a series of visual elements 720 that have been distorted in at least a first direction. A message decoder 730 has a light steering optical element that is distinct from the message surface but when maneuvered by a user 740 adjacent the message surface, a visual image comprising substantially undistorted visual elements, is revealed. The visual image may include any of a variety of images including textual messages and patterns, etc. without departing from the scope of the invention. Such hidden messages can be used for games, sweepstakes, novelties, etc. In a particular exemplary embodiment, the message surface may comprise an electronic display. The electronic display may be any of a variety of devices including but not limited to a TV, a mobile phone or other mobile computing game or communication device, a computer display, a kiosk display, etc. A user receives the hidden message pattern on the display and then holds a decoder sheet up to the display to receive the hidden message.

Figure 8:
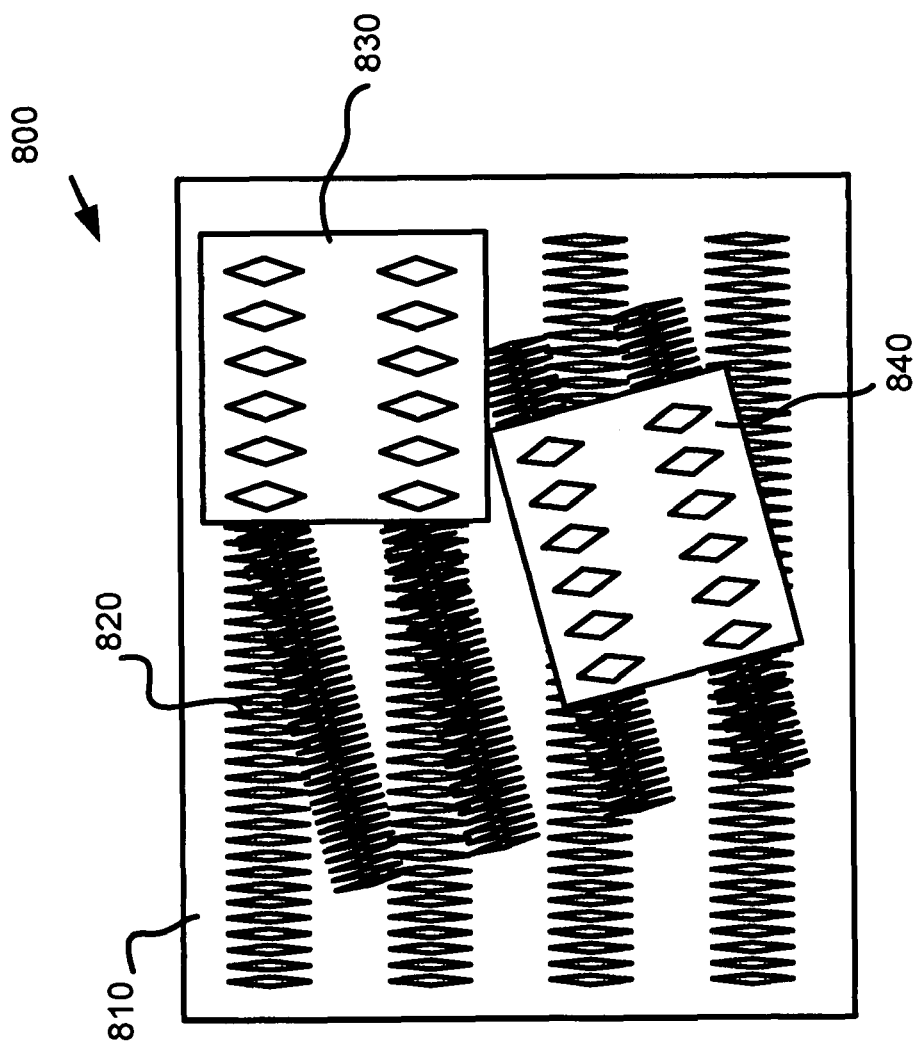
FIG. 8 is an exemplary diagram of a multiple hidden image application.

In an exemplary embodiment, a hidden message system 800 of FIG. 8 includes a first moiré pattern 820 and, a second moiré pattern 830 on a message surface 810. The second moiré pattern has a series of visual elements that are distorted differently than the first moiré pattern. In the case depicted the second moiré pattern 830 is tilted relative to the first moiré pattern 820. In other exemplary embodiments, the pattern 820 and 830 may be aligned but have different distortion ratios and/or may have different spacing.

Hidden message 800 includes a second message decoder 840 that has a light steering optical element that is distinct from the message surface but when maneuvered adjacent the message surface, a visual image comprising substantially undistorted visual elements of the second moiré pattern, is revealed. In one embodiment the second decoder may be tilted at the same angle as second pattern 820. In another embodiment, second decoder 840 may have different optical properties than the first decoder 830. The decoders may be but are not limited to barrier screens and lenticular lenses, among others.

In another exemplary embodiment, one or more portions of the image may be colorized and the one or more decoders have a colorized filter to selectively mask at least some of the image. This may be done to improve the masking of the image and/or to have different images appear depending on the lens.

Figure 9:
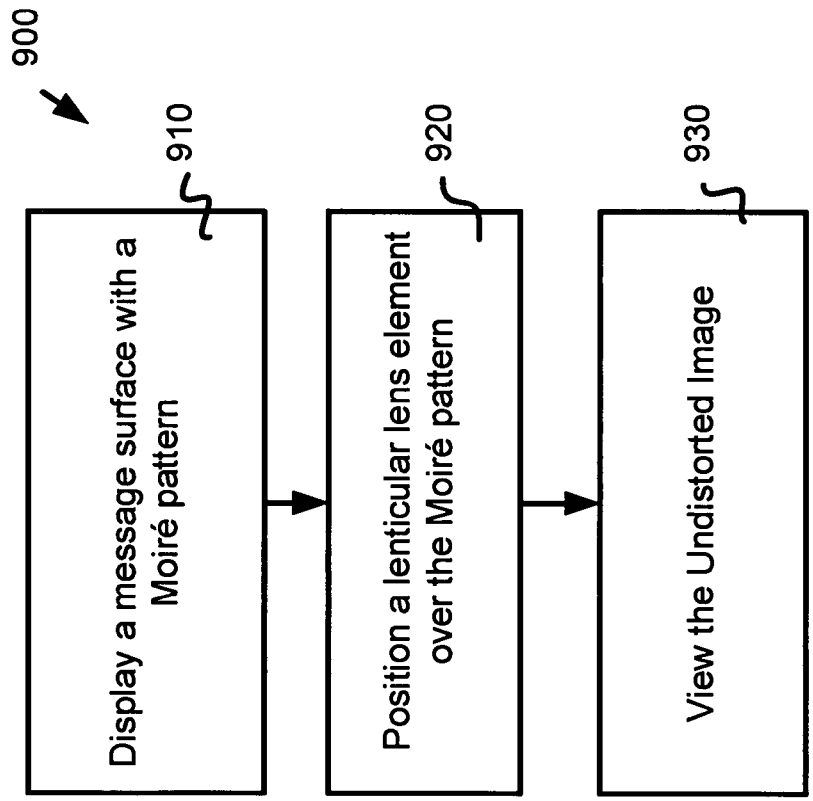
FIG. 9 is an exemplary process diagram of a hidden message production technique.

Referring now to FIG. 9, a process 900 of producing a hidden message is depicted. Process 900 includes displaying a message surface with a first moiré pattern printed thereon (process 910). The first moiré pattern includes a series of visual elements that have been distorted in at least a first direction. This message surface may be printed on a container, a box, an electronic display, a game piece, etc. A user then positions a message decoder having a light steering optical element such as a lenticular lens that is distinct from the message surface, adjacent the message surface (process 920), to reveal a visual image. A user then views the undistorted image through the lens (process 930).

Figure 10:
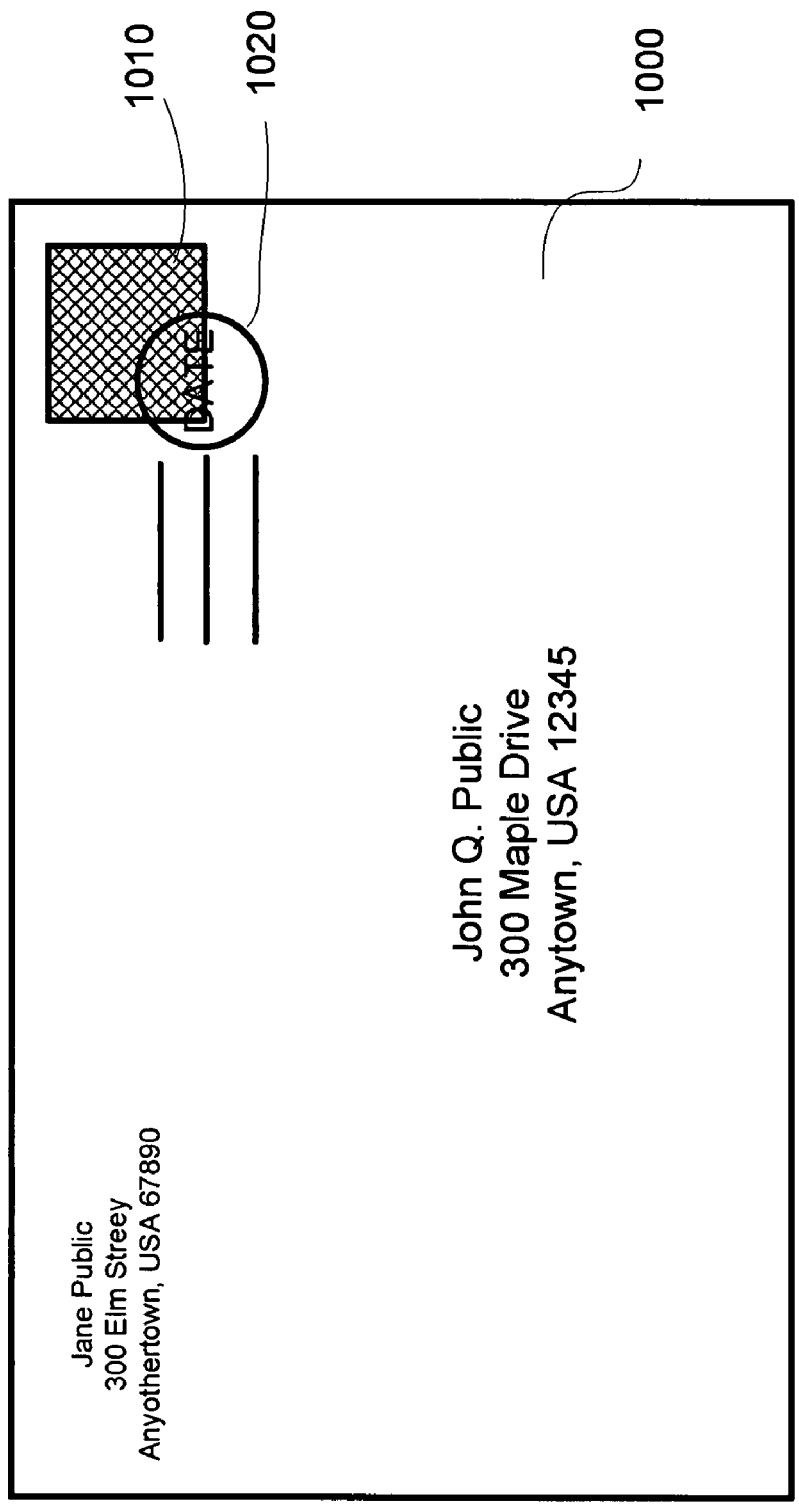
FIG. 10 is an exemplary diagram of a stamp application of the invention.

Referring now to FIG. 10, an envelope 1000 includes a stamp 1010 having a moiré pattern display. The moiré pattern display is formed from a first layer having a moiré pattern printed thereon. The pattern comprises a series of visual elements in a first row that have been distorted at least in a first direction. A light steering optical layer overlays the pattern layer. The light steering optical layer has a plurality of optical features which change the direction of the light and thereby provide a depth effect of the series of visual elements to a viewer looking through the light steering optical layer. The light steering optical layer is configured to allow adherence of cancellation ink to at least one of the first layer and the optical layer. Stamp 1010 has an adhesive layer coupled to the pattern layer which allows a user to adhere the stamp to another substrate such as, but not limited to envelopes or package 1000.

In accordance with an exemplary embodiment, a security feature is incorporated into the optical layer that may not be discernible without the use of a particular type of lens and/or light. In accordance with another exemplary embodiment, a portion of the pattern layer is covered by the optical layer. This allows the cancellation ink to adhere to the pattern layer in the case that the optical layer resists adherence of the ink.

Figure 11:
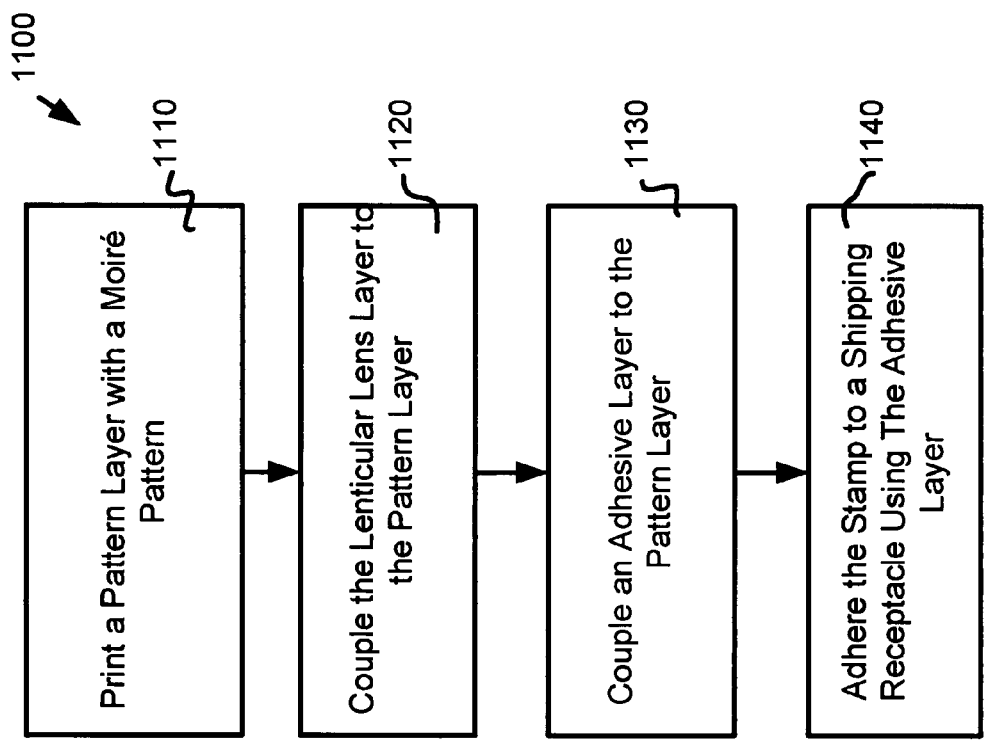
FIG. 11 is an exemplary process diagram of a method of providing a stamp embodying the invention.

Referring now to FIG. 11, a process 1100 of providing a stamp having a moiré pattern display is depicted. A first layer with a moiré pattern is printed on a substrate (process 1110). The pattern has a series of visual elements in a first row that have been distorted at least in a first direction. A light steering optical layer such as but not limited to a lenticular lens is coupled to and overlays the first layer (process 1120). The light steering optical layer includes a plurality of optical features which change the direction of the light and thereby provide a depth effect of a viewer looking through the optical layer to view the stamp. The light steering optical layer is configured to allow adherence of cancellation ink to at least one of the first layer and the optical layer. An adhesive layer is coupled to the first layer (process 1130). Once finished, a user may then adhere the stamp using the adhesive layer to a surface of a shippable receptacle such as but not limited to a box, a carton, a tube, an envelope, etc. The stamp may then be cancelled by applying ink to the face of the stamp which is done by the shipper.

Figure 12:
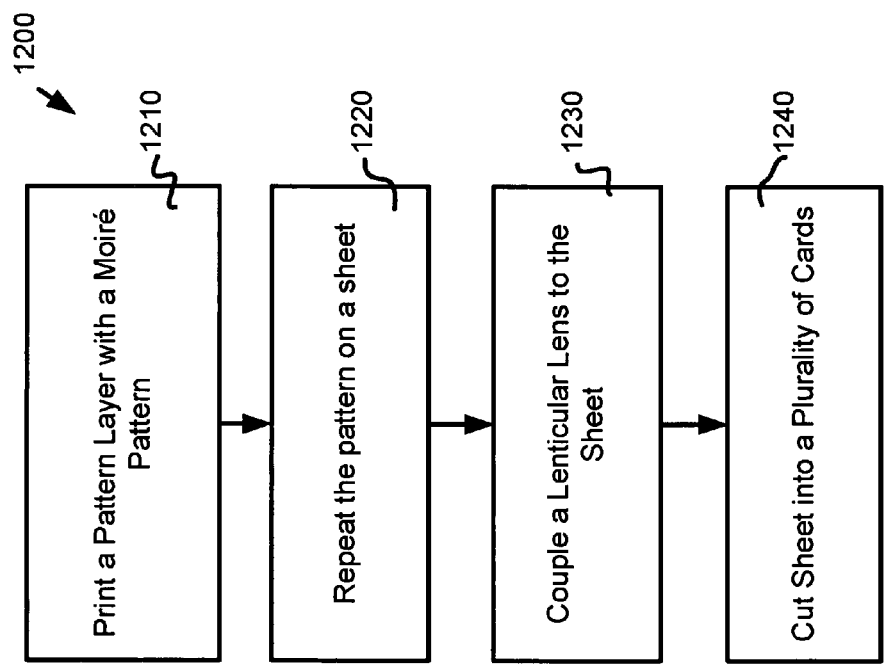
FIG. 12 is an exemplary process diagram of a method of producing a plurality of cards embodying the invention.

Referring now to FIG. 12, a process 1200 of producing a plurality of cards having a moiré pattern display is depicted. The process includes first printing a first layer with a moiré pattern (process 1210). The pattern is repeated a plurality of times on a sheet (process 1220). A light steering optical layer is coupled to and overlays the first layer of at least a portion of the sheet after the printing (process 1230). In accordance with an exemplary embodiment, the coupling of the light steering optical layer is done using a printing process. Also, in accordance with an exemplary embodiment, portions of the sheet may not be printed with the pattern and may not receive the light steering optical layer. This would allow cards to be printed having visual depth areas and non-visual depth areas and/or cards which have no optical devices attached thereto on sheets with cards that have optical elements. In another exemplary embodiment, the backside of the sheet may be printed with information or other moiré pattern designs. After the large sheet is printed, the sheet is cut into a plurality of cards (process 1240).

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The configurations and processes shown and described may differ depending on the chosen performance characteristics and physical characteristics of the display. For example, the cost and depth desired may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A moiré pattern display sheet defined by a surface, comprising:
   a first layer comprising a printed pattern, the pattern comprising a series of visual elements in a first row that have been distorted at least in a first direction, the series of visual elements being generated from an electronically saved file of vector based graphics; and
   a light steering optical layer overlaying the first layer, the light steering optical layer comprising a plurality of optical features which change a direction of light passing through the optical layer,
   wherein the display sheet provides a depth effect of the series of visual elements to a viewer looking through the light steering optical layer.

2. The display sheet of claim 1, wherein the series of visual elements are distorted only in one direction.

3. The display sheet of claim 1, wherein the vector based graphics file allows modifying of the series of visual elements.

4. The display sheet of claim 1, wherein the vector based graphics file enables modifying of the series of visual elements for a desired output device.

5. The display sheet of claim 1, wherein the vector based graphics file includes vector based fonts.

6. The display sheet of claim 1, wherein the light steering optical layer comprises a lenticular lens sheet.

7. The display sheet of claim 1, wherein the light steering optical layer comprises a lenticular lens sheet that has been printed onto the first layer.

8. A method of forming a moiré pattern display sheet defined by a surface, comprising:
   generating an image file having a series of visual elements defined by vector based graphics;
   modifying an image of the image file based on the output printing device;
   printing a first layer comprising the modified image, the modified image comprising the series of visual elements that have been distorted in at least a first direction; and
   providing a light steering optical layer for viewing the first layer therethrough, the light steering optical layer comprising a plurality of optical features which change a direction of light passing through the optical layer,
   wherein the display sheet provides a depth effect of the visual elements to a viewer looking through the light steering optical layer.

9. The method of claim 8, further comprising:
   distorting the printed visual elements in only one direction.

10. The method of claim 8, wherein the light steering optical layer comprises a lenticular lens sheet.

11. The method of claim 8, wherein the light steering optical layer comprises a lenticular lens sheet that has been printed onto the first layer.

12. The method of claim 8, wherein the image file comprises vector based fonts.

13. A hidden message system, comprising:
   a message surface having a first moiré pattern printed thereon, the moiré pattern comprising a series of visual elements that have been distorted in at least a first direction;
   a first message decoder having a light steering optical element that is distinct from the message surface but when maneuvered adjacent the message surface, a visual image comprising substantially undistorted visual elements, is revealed.

14. The hidden message system of claim 13, wherein the message surface comprises an electronic display.

15. The hidden message system of claim 14, wherein the electronic display is part of a mobile electronic device.

16. The hidden message system of claim 13, further comprising:
   a second moiré pattern on the message surface, the second moiré pattern having a series of visual elements that are distorted differently than the first moiré pattern.

17. The hidden message system of claim 16, further comprising:
   a second message decoder having a light steering optical element that is distinct from the message surface but when maneuvered adjacent the message surface, a visual image comprising substantially undistorted visual elements of the second moiré pattern, is revealed.

18. The hidden message system of claim 13, wherein the first message decoder comprises a lenticular lens.

19. The hidden message system of claim 13, wherein the first message decoder comprises a barrier screen.

20. The hidden message system of claim 13, further comprising:
   a masking pattern displayed with the first moiré pattern to inhibit the viewing of the first moiré pattern when the first decoder is not being used.

21. The hidden message system of claim 13, wherein at least a portion of the image is colorized and the first decoder has a colorized filter to mask at least some of the image.

22. The hidden message system of claim 16, wherein the second moiré pattern is distorted in a second direction wherein the second direction is different than the first direction.

23. A method of producing a hidden message, comprising:
displaying a message surface having a first moiré pattern printed thereon, the first moiré pattern comprising a series of visual elements that have been distorted in at least a first direction; and
positioning a first message decoder having a light steering optical element that is distinct from the message surface, adjacent the message surface, to reveal a visual image comprising substantially undistorted visual elements.

24. A stamp having a moiré pattern display, comprising:
a first layer having a pattern printed thereon, the pattern comprising a series of visual elements in a first row that have been distorted at least in a first direction; and
a light steering optical layer overlaying the first layer such that the printed pattern is viewable therethrough.

25. The stamp of claim 24, wherein the light steering optical layer comprises a plurality of optical features which change a direction of light passing through the optical layer and thereby provide a depth effect of the series of visual elements to a viewer looking through the light steering optical layer, the light steering optical layer configured to allow adherence of cancellation ink to at least one of the first layer and the optical layer.

26. The stamp of claim 24, comprising:
an adhesive layer coupled to the first layer and enabling coupling of the stamp to another substrate.

27. The stamp of claim 24, wherein the first layer comprises a printed layer.

28. The stamp of claim 24, wherein the first layer comprises a laminate layer.

29. The stamp of claim 24, further comprising:
a security feature incorporated into the optical layer.

30. The stamp of claim 24, wherein only a portion of the first layer is covered by the optical layer.

31. A method of providing a stamp having a moiré pattern display, comprising:
printing a first layer with a pattern, the pattern comprising a series of visual elements in a first row that have been distorted at least in a first direction;
coupling a light steering optical layer overlaying the first layer, the light steering optical layer comprising a plurality of optical features which change a direction of light passing through the optical layer,
wherein the moiré pattern display provides a depth effect of the series of visual elements to a viewer looking through the light steering optical layer.

32. The method of claim 31, wherein the light steering optical layer is configured to allow adherence of cancellation ink.

33. The method of claim 31, further comprising:
coupling an adhesive layer to the first layer, opposite of the light steering optical layer.

34. The method of claim 33, wherein the adhesive layer comprises a coating.

35. The method of claim 33, wherein the adhesive layer comprises a film adhesive construction, affixed to the first layer.

36. The method of claim 31, further comprising:
adhering the stamp using the adhesive layer to a surface of a shippable receptacle.

37. The method of claim 31, further comprising:
cancelling the stamp by applying ink to the face of the stamp.

38. A method of producing at least one article having a moiré pattern display, the method comprising:
printing a first layer comprising a pattern, the pattern comprising a series of visual elements in a first row that have been distorted at least in a first direction, the pattern or other patterns being printed a plurality of times;
coupling a light steering optical layer overlaying at least a portion of the first layer to produce a moiré pattern display sheet, the light steering optical layer comprising a plurality of optical features which change a direction of light passing through the optical layer,
wherein the moiré pattern display provides a depth effect of the series of visual elements to a viewer looking through the light steering optical layer.

39. The method of claim 34, wherein the coupling of the light steering optical layer is done using a printing process.

40. The method of claim 34, wherein portions of the moiré display sheet are not printed with the pattern and do not receive the light steering optical layer.

41. The method of claim 34, further comprising:
printing a second moiré pattern.

42. The method of claim 34, further comprising:
cutting the moiré pattern display sheet into a plurality of cards.

43. A display sheet for displaying a moiré pattern, the display sheet being defined by a surface, the display sheet comprising:
a first layer comprising a printed pattern, the pattern comprising a series of distorted pattern elements in a first row, each distorted pattern element having at least a first dimension, the series of distorted pattern elements being generated from an electronically saved file of vector based graphics; and
a light steering optical layer overlaying the first layer, the light steering optical layer comprising a plurality of optical features, each feature being configured to shift a direction of a path of travel of light passing through the feature,
wherein the pattern is viewable through the light steering optical layer as a series of resultant pattern elements, each of the resultant pattern elements having a first resultant dimension, the first resultant dimension of the resultant pattern element being equal to the first dimension of the distorted pattern element multiplied by a constant factor, and
wherein the display sheet provides a depth effect of the pattern to a viewer looking through the light steering optical layer.

44. The method of claim 38, wherein the pattern or other patterns are printed a plurality of times on a separate sheet, and the optical layer overlays at least a portion of the separate sheet.

45. The method of claim 44, further comprising:
printing on the backside of the separate sheet.

* * * * *